United States Patent [19]
Burlew

[11] Patent Number: 6,042,750
[45] Date of Patent: Mar. 28, 2000

[54] COMPOSITION FOR INHIBITING CORROSION IN FERROUS METAL

[75] Inventor: James O. Burlew, Topeka, Kans.

[73] Assignee: Joan Docter, Dayton, Ohio

[21] Appl. No.: 09/293,649

[22] Filed: Apr. 17, 1999

[51] Int. Cl.[7] .............................. C09K 3/00; C23F 11/00; C23F 11/06
[52] U.S. Cl. ......................... 252/387; 252/390; 252/394; 422/7; 422/13
[58] Field of Search ................................ 252/387, 390, 252/394; 422/7, 13

[56] References Cited

U.S. PATENT DOCUMENTS

| | | | |
|---|---|---|---|
| 4,298,487 | 11/1981 | Genjida et al. | 252/75 |
| 5,641,735 | 6/1997 | Ho | 508/344 |

FOREIGN PATENT DOCUMENTS

| | | |
|---|---|---|
| 58-016192 | 1/1983 | Japan . |
| 63-125589 | 5/1988 | Japan . |
| 2156848 | 10/1985 | United Kingdom . |

*Primary Examiner*—Gabrielle Brouillette
*Assistant Examiner*—Monique T. Cole
*Attorney, Agent, or Firm*—R. William Graham

[57] ABSTRACT

A composition for inhibiting corrosion of metal is described, wherein the composition comprises at least one tetraalkylammonium halide, at least one alkyldiamine, at least one polyethylene aliphatic hydrocarbon amine, at least one polyethylene fatty acid ester, at least one aliphatic hydrocarbon hydroxyalkyl imidazoline, at least one polyethylene glycol aliphatic ester, and at least one trialkanolamine, and at least one amine oxyalkylate.

13 Claims, No Drawings

COMPOSITION FOR INHIBITING CORROSION IN FERROUS METAL

BACKGROUND OF THE INVENTION

The present invention relates to a composition for inhibiting corrosion of ferrous metal and particularly to a composition for inhibiting corrosion of crude oil pipelines. The present invention also reduces drag on the fluid flowing through the pipelines.

Fluids, such as crude oil, are routinely transported through pipelines which may extend over long distances. Most conduits, e.g., crude oil pipelines must be treated periodically to extend their operational life and/or to improve and maintain their operating efficiencies. For example, pipelines used for transporting crude oil routinely experience severe corrosion problems which, if not treated regularly can result in early failure of the pipeline wall.

Some of the better-known and more successful treating solutions (e.g. polyethylene oxide) have very high viscosities when in liquid solution. These high viscosities require sophisticated pumping systems for injecting these treating solutions into fluids flowing through a tubular and severely restricts the rate at which the treating solution can be added to the fluids.

Furthermore, commonly used corrosion inhibitors are used for the specific purpose of inhibiting corrosion and have limited or no properties for reducing drag on the fluid flowing through the conduit such as crude oil flowing through a pipeline. On the other hand treatments of crude oil pipelines to reduce drag or flow resistance on crude oil flowing through a pipeline, typically, are ineffective to prevent corrosion of the pipeline.

SUMMARY OF THE INVENTION

In accordance with one embodiment of the present invention, a composition is provided comprising a combination of components exhibits corrosion resistance with respect to metals such as ferrous metals. The composition of the present invention not only inhibits corrosion resistance, particularly in crude oil pipelines, but also improves the flow characteristics of the crude oil. The composition of the present invention is a predominately water dispersible composition which comprises:

at least one tetraalkylammonium halide;
at least one alkyldiamine;
at least one polyoxyethylene aliphatic hydrocarbon amine;
at least one polyoxyethylene fatty acid ester;
at least one aliphatic hydrocarbon hydroxyalkyl imidazoline;
at least one polyethylene glycol aliphatic ester;
at least one trialkanolamine; and
at least one amine oxyalkylate.

In accordance with another embodiment of the invention, a method is provided for extending corrosion protection in a metal conduit such as a crude oil pipeline. The composition may be directly applied to the metal surface as a protective coating or, in the case of crude oil, it may be injected into the crude oil flowing through a pipeline or added directly to crude oil in standing metal tanks for corrosion protection of the pipelines or tank.

DETAILED DESCRIPTION OF THE INVENTION

The present invention is directed to a composition for inhibiting corrosion of ferrous metal pipelines. The composition comprises a combination of:

at least one tetraalkylammonium halide;
at least one alkyldiamine;
at least one polyoxyethylene aliphatic hydrocarbon amine;
at least one polyoxyethylene fatty acid ester;
at least one aliphatic hydrocarbon hydroxyallyl imidazoline;
at least one polyethylene glycol fatty ester;
at least one trialkanolamine; and
at least one amine oxyalkylate has been found to be particularly effective in reducing the corrosion of metal surfaces such as ferrous metal surface found in crude oil pipelines and standing tanks.

The tetraalkylammonium halide useful as a of the composition is represented by formula (I):

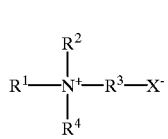

(I)

where $R^1, R^2, R^3$ and $R^4$ are the same or different and represent $C_1$–$C_{12}$ aliphatic hydrocarbon, and X is F, Cl, Br or I. Preferably, the tetralkylammonium halide is a tetraalkylammonium chloride composed of two lower higher alkyl groups each of which contains about 1 to 6 carbon atoms and two alkyl groups, each of which contains about 6 to 12 carbon atoms. Maquat 4480-E, 80%, a didecyldimethylammonium chloride available from Mason Chemical Company has been found to be particularly useful in the present invention.

The alkyldiamine useful as a component in the present invention is represented by formula (II):

(II)

where $R^5$ is a linear or branched $C_1$–$C_8$ alkyl group. Dytek A, a 2-methyl-1,5-pentanediamine available from Du Pont has been found to be particularly useful in the present invention.

The polyoxyethylene aliphatic hydrocarbon amine useful as a component in the present invention is a polyoxyethylene $C_{10}$–$C_{18}$ aliphatic hydrocarbon amine. Representative examples of such polyoxyethylene aliphatic hydrocarbon amines include polyoxyethylene stearyl amine, polyoxyethylene myristyl amine, polyoxyethylene palmityl amine, polyoxyethylene undecyl amine, polyoxyethylene decyl amine, polyoxyethylene oleyl amine and the like. Rhodameen OA-910, a polyoxyethylene oleyl amine has been found to be particularly effective as the polyoxyethylene fatty amine in the present invention.

The polyoxyethylene fatty acid ester useful as a component of the compostion is typically an ester of polyoxyethylene sorbitol with one or more fatty acids. Examples of such polyoxyalkylene fatty acid esters includes polyoxyethylene sorbitan monolaurate, polyoxyethylene sorbitan monooleate, polyoxyethylene sorbitan dilaurate, polyoxyethylene sorbitan dipalmitate, polyoxyethylene sorbitan trilaurate, polyoxyethylene sorbitan trioleate, polyoxyethylene sorbitan, trimyristate, polyoxyethylene sorbitan tripalmitate, polyoxyethylene sorbitan tetraoleate, polyoxyethylene sorbitan tetrastearate, polyoxyethylene sorbitan tetrapalmitate, and mixtures thereof. Polyoxyethylene sorbitan esters derived from the reaction of polyoxyethylene sorbitol with a mixture of fatty acids are also contemplated. The above mentioned polyoxyalkylene fatty acid esters are for exemplification purposes only and it is understood that other polyoxyalkylene fatty acid esters are contemplated. Alkamuls PSTO-20, a polyoxyethylene sorbitan trioleate available from Rhone-Poulene has been found to particularly useful in the present invention.

Another component of the composition is an aliphatic hydrocarbon hydroxyalkyl imidizoline wherein said aliphatic hydrocarbon preferably contains about 10 to 18 carbon atoms. Typical examples of such hydroxyalkyl imidizolines include decyl hydroxymethyl imidazoline, dodecyl hydroxymethyl imidizoline, stearyl hydroxymethyl imidazoline, lauryl hydroxymethyl imidazoline, myristyl hydroxymethyl imidazoline, palmityl hydroxymethyl imidazoline, oleyl hydroxymethyl imidazoline, decyl hydroxyethyl imidazoline, undecyl hydroxyethyl imidazoline, docedyl hydroxyethyl imidazoline, stearyl hydroxyethyl imidazoline, lauryl hydroxyethyl imidazoline, myristyl hydroxyethyl imidazoline, palmityl hydroxyethyl imidazoline, decyl hydroxypropyl imidazoline, undecyl hydroxypropyl imidazoline, docecyl hydroxypropyl imidazoline, stearyl hydroxypropyl imidazoline, lauryl hydroxypropyl imidazoline, myristyl hydroxypropyl imidazoline, palmityl hydroxypropyl imidazoline, oleyl hydroxypropyl imidazoline, and the like, Miramine O, an oleyl hydroxyethyl imidazoline available from the Witco Corporation has been found to be effective in the present invention.

The polyethylene glycol aliphatic ester useful as a component of the composition is preferably a polyethylene glycol $C_{10}$–$C_{18}$ aliphatic ester which includes polyethylene glycol oleate, polyethylene glycol stearate, polyethylene glycol myristate, polyethylene glycol palmitate, polyethylene glycol laurate, and the like. Alkamus O-14, a polyethylene glycol oleate has been found to be useful in the present invention.

The trialkanolamine useful as a component of the composition is preferably a lower trialkanolamine containing 1 to 3 carbon atoms such as triethanolamine available from Ashland to Chemical Company.

The amine oxyalkylate useful as an additional component in the invention is an amine oxyalkylate containing multiples of three carbon atoms, e.g., Wittbreak DRI-9045, an amine oxyalkylate available from the Witco Corporation is particularly useful in the present invention.

The corrosion inhibitor composition of the present invention is typically in the form of a viscous liquid having a viscosity of about 50–200 cps at 25C, a density of about 8.0 pounds/U.S. gallon, and a flash point of about 177° F. (80° C.). The composition is dispersible in fresh water, sea water(brine) and hydrocarbon solvents. A particularly notable property of the present corrosion inhibitor composition is its ability to coat bare metal, particularly non-phosphated metal, uniformly with no "pull back" from edges and crevices; thus, providing good implant residual protection from corrosive materials including accelerated oxidation from air. Furthermore, the present composition is effective on all commonly used ferrous embrittlement.

The concentration of the specified components of the present composition are those concentration ranges which provide the desired characteristics of the composition of the present invention. For example, the composition of the present invention will typically contain about 25 to 35% tetraalkylammonium halide, about 2 to 8% alkyl diamine, about 5 to 15% polyoxyethylene aliphatic hydrocarbon amine, about 5 to 15% polyoxyethylene fatty acid ester, about 15 to 25% aliphatic hydrocarbon hydroxyalkyl imidazoline, about 5 to 15% polyethylene glycol aliphatic ester, about 5 to 15% trialkanolamine and about 2 to 8% amine oxyalkylate. All percentages are by volume unless otherwise specified. The viscosity of the composition may be reduced by diluting the composition with the about 50% or greater of water.

The composition of the present invention is rapidly dispersed into crude oil and provides homogeneity of micelles to increase lubricity of flow. Furthermore, the composition neutralizes any organic acids and/or carbonic acid which may be present in the crude oil. Such acids are responsible for corrosion to the pipelines.

A second embodiment of the invention is a method for inhibiting the corrosion of metal such as ferrous metal. Preferably, the method of the present invention is useful in providing extended corrosion resistance to crude oil pipelines. In accordance with one aspect of this embodiment, the method comprises applying a corrosion-inhibiting effective amount of a composition useful for inhibiting corrosion of metal, as a coating on the metal surfaces to be protected using a spray or mist of the water soluable composition. Other additives which do not affect the corrosion resistance and/or drag reducing characteristics of the composition may be added to the composition in an amount to effect their desired purpose. Typically, the solution will contain about 5 to 15% and preferably about 8 to 12 percent of the corrosion-inhibiting composition of the present invention in water. In another aspect of the second embodiment of the invention, the composition is injected into a crude oil pipeline using a conventional monitoring injection pump, or the composition can be added directly to standing tanks of crude oil. Typically, the composition is used in the pipeline or standing tanks at a concentration of about 50 to 200 ppm, depending upon the type of the sulfur and brine content of the crude oil.

EXAMPLE

Into a 400 gallon tank, the following ingredients are blended with continous stirring until throughly mixed: 300 liters of didecyldimethylammonium chloride, 80%; 50 liters of 2-methyl-1,5-pentanediamine, 100 liters of polyoxyethylene (30) oleyl amine, 100 liters of polyoxyethylene (20) sorbitan trioleate, 200 liters of oleyl hydroxyethyl imadazoline, 100 liters of polyethylene glycol (14) oleate, 100 liters of triethanolamine, and 50 liters of Wittbreak DRI-9045, an amine oxyalkylate from the Witco Corporation. 500 Liters of water is added to the solution to provide the desired viscosity and 20 grams of Brilliant Blue, available from Pylam Products Company under the name Pylaklor 5-566, is predissolved in one quart of water with continued stirring and added to the solution to provide color coding.

The composition prior to dilution with water has the following properties:

| | |
|---|---|
| Form . . . | blue viscous liquid |
| pH . . . | slightly alkaline |
| Flash Point . . . | 80° C. (177° F.) |
| Viscosity (cps at 25 c) . . . | 50–200 |
| Pour point . . . | 23° F. (−5° C.) |
| Density (pounds/U.S. gallon . . . | 8.3 |

| Solubility | |
|---|---|
| Fresh water . . . | Dispersible |
| Sea water . . . | Dispersible |
| Hydrocarbon solvents . . . | Dispersible |

Test panels of ferrous metal treated with the above composition under normal conditions pass 168 hours of salt spray testing.

It will be recognized by those skilled in the art that changes may be made to the above described embodiments of the invention without departing from the broad concepts thereof. It is understood, therefore, that this invention is not limited to the particular embodiments disclosed but it is intended to cover all modification which are within the scope and spirit of the invention as defined by the appended claims.

What is claimed is:

1. A composition consisting essentially of:
   about 25 to 35% tetraalkylammonium halide;
   about 2 to 8% alkyldiamine;
   about 5 to 15% polyoxyethylene aliphatic hydrocarbon amine;
   about 5 to 15% polyethylene fatty acid ester;
   about 15 to 25% aliphatic hydrocarbon hydroxy imidazoline;
   about 5 to 15% polyethylene glycol aliphatic ester;
   about 5 to 15% trialkanolmine; and
   about 2 to 8% amine oxyalkylate; and the balance of the composition is diluted with up to about 50% solvent, said composition characterized as exhibiting corrosion resistance toward ferrous metal and as reducing drag on fluids flowing through a ferrous metal pipeline.

2. The compostion of claim 1, wherein said tetraalkylammonium halide is didecyldimethylammonium chloride.

3. The composition of claim 1, wherein said alkyldiamine is 2-methyl-1,5-dipentanediamine.

4. The composition of claim 1, wherein said polyoxyethylene aliphatic hydrocarbon amine is polyoxyethylene oleyl amine.

5. The composition of claim 1, wherein said polyoxyethylene fatty acid ester is polyoxyethylene sorbitan trioleate.

6. The composition of claim 1, wherein said aliphatic hydrocarbon hydroxyalkyl imadazoline is oleyl hydroxymethyl imadazoline.

7. The composition of claim 1, wherein said polyethylene glycol fatty ester is polyethylene glycol oleate.

8. The composition of claim 1, wherein said trialkanolamine is triethanolamine.

9. The composition of claim 1, wherein said amine oxyalkylate is propylene glycol hydroxyamine polymer.

10. The composition of claim 1, wherein said solvent is water.

11. A composition for use in a crude oil pipeline, said composition consisting essentially of:
    about 25 to 35% didecyldimethylammonium chloride;
    about 2 to 8% 2-methyl-1,5 pentanediamine;
    about 5 to 15% polyoxyethylene oleyl amine;
    about 5 to 15% polyoxyethylene sorbitan trioleate;
    about 5 to 15% oleyl hydroxymethyl imadazolie;
    about 5 to 15% polyethylene glycol oleate;
    about 5 to 15% triethanolamine; and
    about 2 to 8% propylene glycol hydroxy amine polymer,
    said composition characterized as exhibiting corrosion resistance toward ferrous metal and as reducing drag on crude oil flowing through a crude oil pipeline.

12. The composition of claim 11 wherein said composition is coated on the inner surface of said crude oil pipeline.

13. The composition of claim 11 wherein said composition is added to said crude oil flowing through said crude oil pipeline.

* * * * *